(12) United States Patent
Doherty et al.

(10) Patent No.: US 6,650,639 B2
(45) Date of Patent: *Nov. 18, 2003

(54) SECURE FAST PACKET SWITCH HAVING IMPROVED MEMORY UTILIZATION

(75) Inventors: James P. Doherty, Nashua, NH (US); Andrew Grimes, Cape Neddick, ME (US)

(73) Assignee: Enterasys Networks, Inc., Andover, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/578,143

(22) Filed: May 24, 2000

(65) Prior Publication Data

US 2003/0048779 A1 Mar. 13, 2003

Related U.S. Application Data

(63) Continuation of application No. 08/720,090, filed on Sep. 27, 1996, now Pat. No. 6,101,170.

(51) Int. Cl.[7] ........................... H04L 12/28; G06F 12/04
(52) U.S. Cl. ................... 370/389; 370/395.31; 711/221
(58) Field of Search ................................ 370/254–256, 370/252–253, 379–389, 392, 394, 395–396, 397–402, 409, 419, 422, 423, 424, 428, 395.31, 395.32, 216, 221; 707/1, 3, 6, 100, 104, 509, 395.31, 395.32; 709/238, 242, 395.31, 395.32; 711/46, 221, 395.31, 216

(56) References Cited

U.S. PATENT DOCUMENTS

| | | | |
|---|---|---|---|
| 5,150,464 A | | 9/1992 | Sidhu et al. |
| 5,400,323 A | | 3/1995 | Frenzel, III et al. |
| 5,452,296 A | * | 9/1995 | Shimizu ..................... 370/399 |
| 5,485,455 A | | 1/1996 | Dobbins et al. |
| 5,528,583 A | * | 6/1996 | Acampora ................. 370/395 |
| 5,539,884 A | * | 7/1996 | Robrock .................... 370/395 |
| 5,544,161 A | | 8/1996 | Bigham et al. |
| 5,649,108 A | * | 7/1997 | Spiegel ...................... 370/400 |
| 6,101,170 A | * | 8/2000 | Doherty ..................... 370/255 |

* cited by examiner

Primary Examiner—Steven Nguyen
(74) Attorney, Agent, or Firm—Wolf, Greenfield & Sacks, P.C.

(57) ABSTRACT

In a secure fast packet switch having a plurality of input ports and a plurality of output ports, a method of determining which port in the plurality of output ports data that is received on one input port in the plurality of input ports is to be sent to, the method including the steps of determining a physical layer address of a sending node, determining a physical layer address of a receiving node, determining an input port in the plurality of input ports that the data was received on, determining if the physical layer address of the sending node and the physical layer address of the receiving node are an allowed combination, determining the magnitude of the node identification number of the sending node, determining the magnitude of the node identification number of the receiving node, obtaining outbound port information from a first predetermined location in a data structure stored in a memory if the node identification number of the sending node is greater than the node identification number of the receiving node, and obtaining outbound port information from a second predetermined location in the data structure stored in the memory if the node identification number of the sending node is less than the node identification number of the receiving node. Circuitry that carries out the method is also described along with an exemplary data structure.

3 Claims, 9 Drawing Sheets

SECURE FAST PACKET SWITCH HAVING IMPROVED MEMORY UTILIZATION

This is a continuation of application Ser. No. 08/720,090 filed Sep. 27, 1996, now U.S. Pat. No. 6,101,170

BACKGROUND OF THE INVENTION

1. Field of the Invention

The invention relates generally to communication networks, and more particularly to an apparatus, method, and data structure for providing secure internetworking of packet-based LAN and WAN segments by establishing temporary connections which are protocol independent and transparent to the end systems.

2. Discussion of the Related Art

Secure Fast Packet Switching is a new technology that provides the same or better reliability and security as routers and with much greater packet switching performance, without an increase in cost.

SFPS provides for high performance packet switching based on source and destination MAC IDs—the unique medium access control (MAC) address assigned to each end system by the IEEE. End-to-end connections are determined by a network management application that provides security and best path routing determinations based on a number of constraints. By switching packets based only on MAC layer information, the network infrastructure can remain protocol insensitive. This allows the network to provide an equal QOS to users sending packets based on NetBIOS, LAT, IP, IPX, SNA, or any other protocol. As protocols evolve the network and its management infrastructure will not have to be reworked to support the new protocols.

More specifically, the system uses source and destination MAC addresses (i.e., physical layer addresses) which alone, or in combination with the input port on the switch, form a unique "connection identifier" for any communication exchange between end systems to be connected through an SFPS device. A specific example is as follows:

input port=2
source MAC address=00:00:1D:01:02:03
destination MAC address=00:00:1D:11:22:33;
together, these form a "tuple" bound to a specific unidirectional flow from source address to destination address. All packets that have this tuple are automatically switched according to the operation of the SFPS.

A secure fast packet switch is described in U.S. Pat. No. 5,485,455, which is incorporated herein by reference in its entirety.

In the '455 patent, a connection database containing connection table is disclosed that contains entries for each end system pair (i.e., source address (SA)/destination address (DA)) that can communicate with each other.

It would be desirable to provide a way of reducing the number of connection table entries required so as to in turn reduce the amount of memory required in the secure fast packet switch.

SUMMARY OF THE INVENTION

Broadly, the present invention relates to a method and apparatus for reducing the number of entries required in the connection table described in the '455 patent, while still maintaining all of the benefits of the secure fast packet switch. In one embodiment of the invention, the number of entries required is one half the number of entries that would be required if the connection table had a single connection entry for every SA/DA pair. This results in a 50% savings in the amount of memory required. Advantageously, the reduction in the amount of memory required means that twice as many SA/DA pairs can be stored in the connection table, thus doubling the effective capacity of the database memory associated with the secure fast packet switch.

The present invention improves upon the system disclosed in the '455 patent by providing in a secure fast packet switch having a plurality of input ports and a plurality of output ports, a method of determining which port in the plurality of output ports data that is received on one input port in the plurality of input ports is to be sent to, the method including the steps of determining a physical layer address of a sending node, determining a physical layer address of a receiving node, determining an input port in the plurality of input ports that the data was received on, determining if the physical layer address of the sending node and the physical layer address of the receiving node are an allowed combination, determining the magnitude of the node identification number of the sending node, determining the magnitude of the node identification number of the receiving node, obtaining outbound port information from a first predetermined location in a data structure stored in a memory if the magnitude of the node identification number of the sending node is greater than the magnitude of the node identification number of the receiving node, and obtaining outbound port information from a second predetermined location in the data structure stored in the memory if the magnitude of the node identification number of the sending node is less than the magnitude of the node identification number of the receiving node.

In another embodiment of the invention, the method further includes the step of obtaining input port information from a third predetermined location in the data structure stored in the memory if the magnitude of the node identification number of the sending node is greater than the magnitude of the node identification number of the receiving node.

In another embodiment of the invention, the method further includes the step of obtaining input port information from a third predetermined location in the data structure stored in the memory if the magnitude of the node identification number of the sending node is less than the magnitude of the node identification number of the receiving node.

In accordance with another aspect of the invention, a data structure is provided, the data structure including a first field in a first predetermined location in the data structure, the first field containing data identifying a first input port in the switch, a second field in a second predetermined location in the data structure, the second field containing data identifying a second input port in the switch, a third field in a third predetermined location in the data structure, the third field containing data identifying first output port in the switch, and a fourth field in a fourth predetermined location in the data structure, the fourth field containing data identifying a second output port in the switch.

BRIEF DESCRIPTION OF THE DRAWINGS

In the drawings, which are incorporated herein by reference and in which like elements have been given like reference characters.

FIGS. 6C-1, 6C-2, 6C-3, and 6C-4 are a flow chart showing processing of a data packet by an SFPS switch.

DETAILED DESCRIPTION

1. Establishing "Virtual LANs" and "Virtual Connections"

Figure 1:
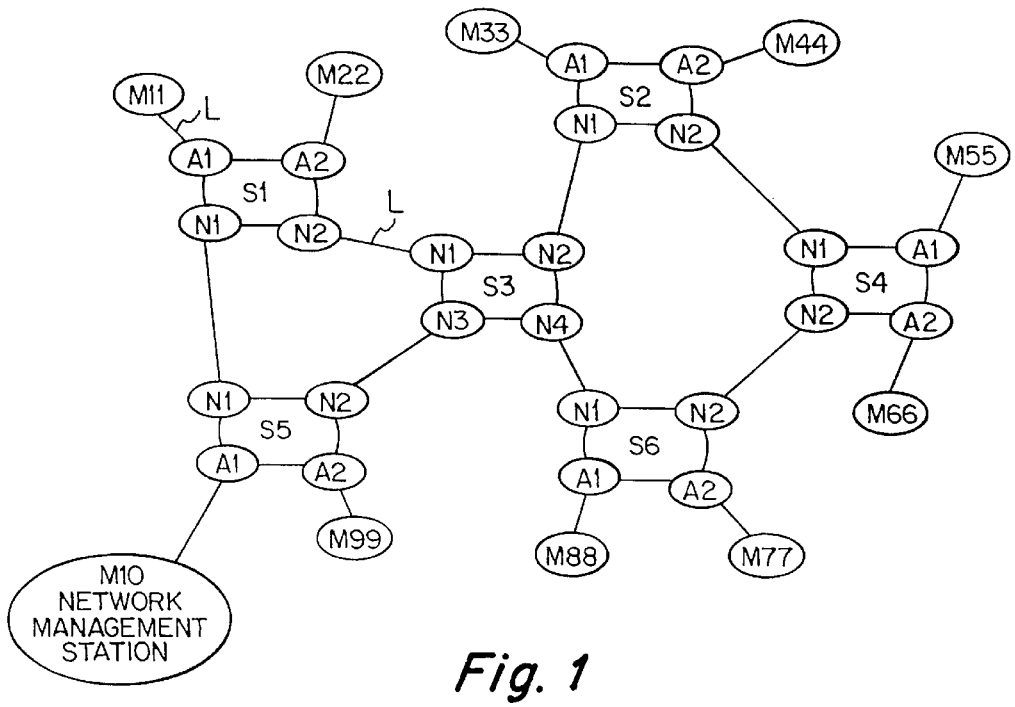
FIG. 1 is a schematic illustration of a network topology built with SFPS switches.

FIG. 1 shows a representative network topology built with six secure fast packet switches (SFPS) labeled S1 to S6. Each SFPS switch has for example, four ports. Some ports are labeled A for Access and some are labeled N for Network. Access ports provide network access security and packet routing services. Network ports do not perform security services since this function has already been performed at the original entry access port. The end systems are labeled "M__"; one of the end systems M10, comprises a network management server (NMS). This NMS will also contain the SFPS directory and path server.

Each SFPS includes a function known as a Connection Database Look-Up Engine (CDLUE). The CDLUE's job is to check the source and destination MAC IDs of a packet received by the SFPS against its internal database, called the connection table. The CDLUE will forward (route) packets out one or more ports based on the results of the connection table look-up. This function is similar to a bridge except that SFPS uses both the source and the destination MAC IDs to make the forwarding decision. Bridges only use the MAC destination address. Also, if a bridge isn't sure where a destination is, it will forward the packet out all ports except the one it came in on. This "flooding" results in loss of control over network access, bandwidth, information security, network performance and reliability. Because SFPS uses both the source and destination addresses it does not have the failings of current bridges and routers.

The network topology view of FIG. 1 will be used to illustrate how "virtual LANs" and "virtual connections" can be built to enable protocol insensitive routing and increased network security to be achieved. In this case, there are two logical work group LANs: WG1=(M11, M22, M88), and WG2=(M33, M55, M77). Two connections will be attempted: (M11, M99) and (M11, M66).

1.1 EXAMPLE 1—M11 TRANSMITS A PACKET DESTINED FOR M99

1. Access switch S1 receives this packet on inbound port A1.
2. S1 looks up in its connection table to determine if a valid connection (M11 to M99) exists.
3. No connection is yet defined so S1 initiates a message exchange to the SFPS Server (Network Management Station) M10. This message exchange is an independent exchange between the switch S1 and the server M10.

a) The switch sends a message asking if M11 can (is allowed) to talk to M99.
   This is where security, policy and administrative constraints are applied.
b) If the two stations are allowed to have a connection, then the server M10 will determine the path of switches to be used to provide a logical connection between M11 and M99.
c) Since M11 can reach M99 by two different paths, one "best" path is selected. "Best" is constrained by, for example, cost, bandwidth, policy, loss, and other metrics.
d) Let's assume the best path is chosen as traversing S1 to S3 to S5.
e) The server M10 will then "program" each of these switches to support this connection path.
*Important point: Since SFPS has to be transparent in the M11–M99 interaction, it cannot modify the packets being exchanged. Typically, in traditional switches, the switch sets a connection-identifier that gets put in each packet, and is remapped at each switch, to allow the packet to be switched along the path. Since SFPS cannot touch any packet content, it has to have something in the existing packet that it can use in each switch to treat as a unique connection-identifier while preserving the M11 to M99 packet exchange. What is unique about SFPS is that it treats:
source MAC address
destination MAC address
as a unique "connection-identifier." Note, that this is an implicit connection-identifier in each packet based on the arriving inbound port, but is an explicit connection-identifier in each switch's connection table.
f) Each of the switch's connection tables will look like this:

|     | Souce Port | Source MAC | Dest. MAC | Outport |
|-----|------------|------------|-----------|---------|
| S1: | A1         | M11        | M99       | N2      |
| S3: | N1         | M11        | M99       | N3      |
| S5: | N2         | M11        | M99       | A2      | g) So, once all these switches are programmed (through, for example, SNMP Network Management Protocol), a packet from M11 destined for M99 would look like this:

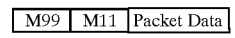

and would be "switched" along the path as follows:

M11+A1–S1–N2→N1S3–N3→N2–S5–A2→M99 h) Note that once the switches have these connections defined, the packets traverse M11 to M99 without any additional call-setup or network management interaction. This provides the fast packet switching between the end systems. Note, the M11 to M99 packet exchange occurs as if they were directly connected on the same LAN segment. Thus, the "virtual LAN" is provided, as well as transparent switching.
i) At each switch, the switch looks up in the packet the source and destination MAC addresses and combines them with the inbound (source) port to form the connection identifier. If this connection is in its table, the packet will be forwarded (switched) out the designated output port. All subsequent M11 to M99 packets will take the same path through the switches. Note if a valid source-destination MAC pair arrives on a port other than the defined inport, it will be considered a security violation.

j) These "virtual connections" exist until they are explicitly removed by the network management system. This could be due to timeout (idle connection) or resource management. No explicit disconnect is done by M11 or M99.

1.2 EXAMPLE 2—M11 TRAMSITS A PACKET DESTINED FOR M66

1. If M11 also transmits data destined for M66, the same set of processing would be done:
   a) S1 receives the packet.
   b) S1 looks up in its connection table and with no match will send a message to server M10.
   c) Server M10 will reject the packet as unauthorized (not within one of the two approved logical work group or "virtual" LANS) and the packet will be dropped without a connection being made. An alarm may be set to indicate that an unauthorized transmission has been attempted.

2. SFPS Management Services

In this particular embodiment, the SFPS switches require five management service functions to be performed at a higher layer in the network management framework. The five functions are: Route Service, Access Security, Directory Service, Accounting, and Bandwidth Management. A general review of each management function is provided below. The functions are usually performed in software and may reside on none, some, or all SFPS in a network. Since some of the management functions are required by multiple-user applications, they may be shared and would be already available.

2.1 Route Services Management

These services are required so the SFPS can determine the best path to route a connection. When there are many possible "paths" to a destination, the route management will determine which one should be used and pass this information to the SFPSs so that their connection databases can be configured correctly. A preferred method of making a best path determination is described in a later section.

2.2 Access Security Management

These services are optional and can be used to limit user access to only a specified group of SFPS access ports. An access group may contain from 2 to any number of users. Users can only send or receive packets from members of their access group. Access to any other access ports would be prevented by filtering out those packets. Security also includes administrative policies.

2.3 Directory Services Management

These services provide the Route Services Management with a user to access port and switch database so that packets destined for users not directly connected to the local access switch can be located and then have a path to that switch selected. This service reduces the amount of time it takes for a connection to be established. An ISO X.500 Directory Services may be used which is compatible with NIS, Novell 4.0 and others.

2.4 Accounting Management

These services provide an accounting of each user's use of the network and provide the network manager with usage and cost reporting so that proper use of corporate network resources can be verified and traced.

2.5 Bandwidth Management

As network usage grows, congestion of the network connection will likely occur. The bandwidth management service insures that bandwidth is allocated to highest priority users first and that the network is always available for those users should congestion occur. Lower priority users would have their packets dropped when congestion occurred. A specific multi-level programmable arbiter for making bandwidth allocations is described in a later section.

3. SFPS Hardware Implementation

Figure 2:
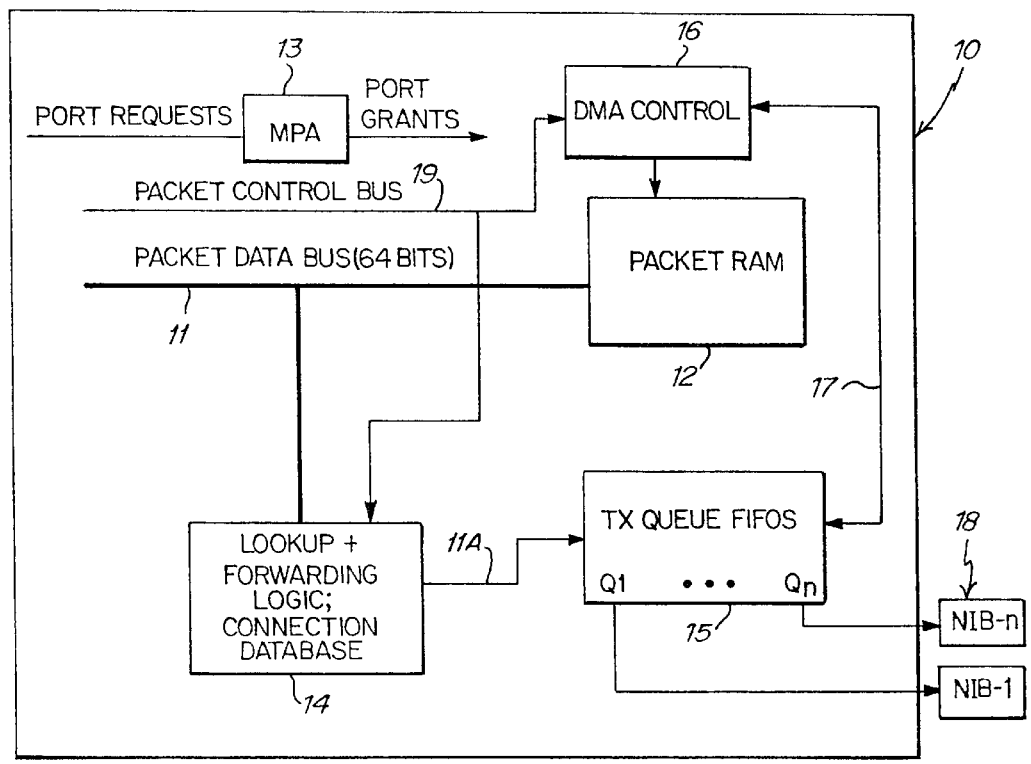
FIG. 2 is a schematic illustration of the internal components of an SFPS switch in a hardware embodiment.
Figure 3:
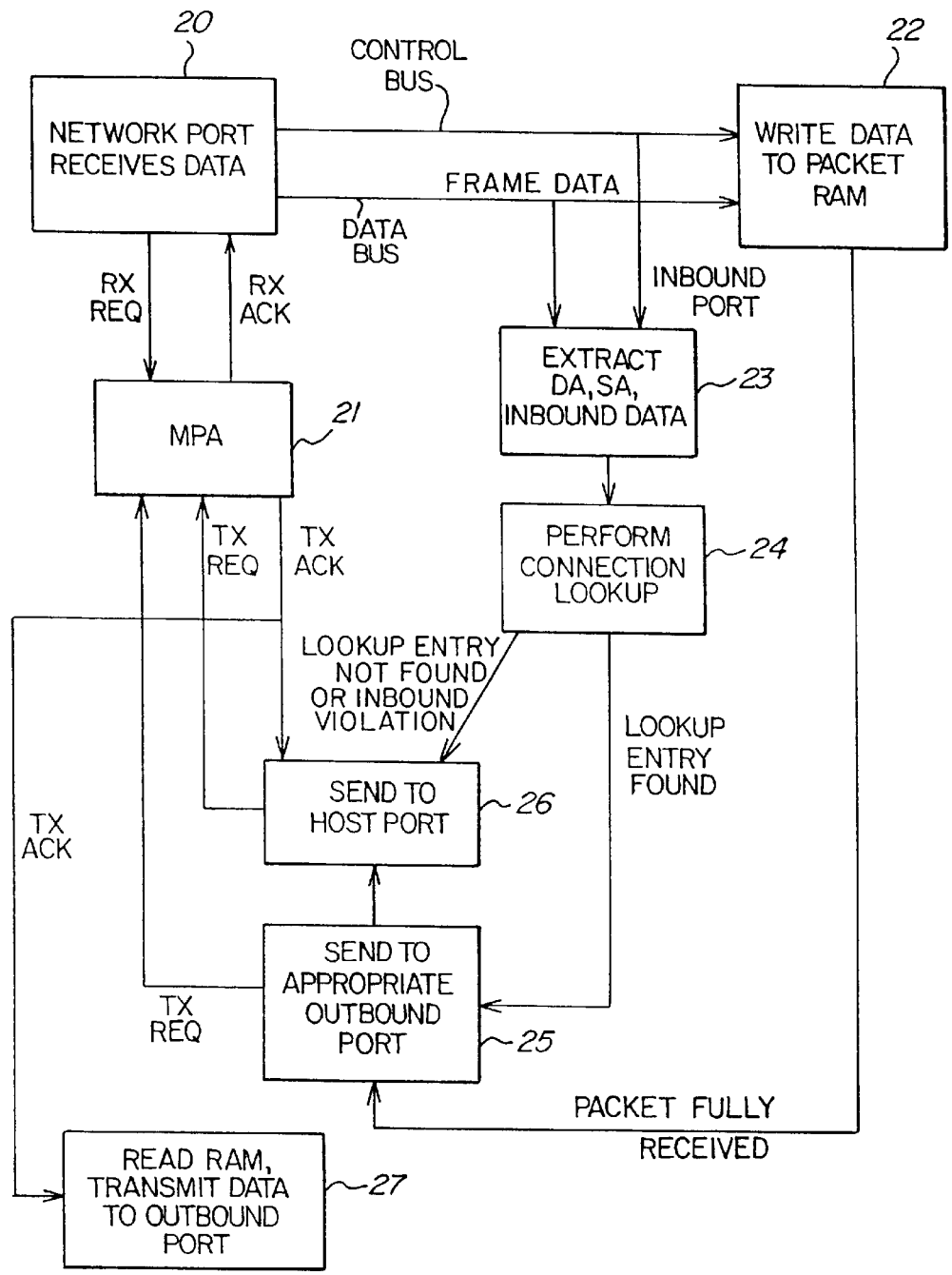
FIG. 3 is a flow chart of the operation of the SFPS switch of FIG. 2.

In a specific hardware embodiment, the SFPS is a multiported data communications device shown in FIG. 2 (physical layer—external ports not shown). FIG. 3 is a flow chart showing the frame processing of the SFPS switch.

Data enters the SFPS 10 through one of its ports in a format known as the Canonical Frame Format, which is described in a later section. The canonical frame format has the following structure:

TABLE 1

| Canonical Frame Format | | | | | |
|---|---|---|---|---|---|
| Header | Destination Address | Source Address | LLC Field | Information Field | Check Sum |
| (64 bits) | (64 bits) | (64 bits) | (64 bits) | (0 or more bytes) | (16 bits) |

As shown in FIG. 2, the SFPS 10 has a common 64 bit wide data packet bus 11 that is shared by all ports, as well as by a memory array referred to as "packet ram" 12. When data arrives at a given port (step 20 in FIG. 3), the port signals to a multilevel programmable arbiter (MPA) 13 that it is ready to transfer data into the SFPS system (step 21). The MPA is used to allow each port a "timeslice" on the bus 11 so that data may be transferred into the SFPS and stored into packet ram.

The SFPS system requires ports that deliver data in to deliver an entire packet before beginning the next packet. The packet data bus control system in conjunction with the MPA establishes a 10 clk (clock) cycle "timeslice" for data transfers (32 bytes of information). Transfers can be in either direction. Inbound transfers are referenced as a port delivering data into the packet ram, and outbound transfers are those in which data is sourced from the packet ram and sent out through a port towards the datalink. A transfer of the data packet in or out of the SFPS may take multiple timeslices.

Reference is now made to FIG. 3, which figure is a flow chart of the operation of the SFPS switch of FIG. 2. When a port receives an acknowledgment from the MPA, it signals "start of frame" (SOF) on the control bus 19. This informs the lookup process that the beginning of a data packet will be traversing the bus 11 and that it should copy the DA and SA fields so that it may proceed with a lookup operation (step 23). Now, in parallel, the lookup process will be forming the results word (steps 24, 26) while the port continues to transfer the entire packet into the packet ram 12 (step 22), controlled by the DMA process. Once the end of the data packet is delivered, the port signals "end of frame" EOF which tells the DMA 16 that it is done. This causes the DMA, who has been maintaining a byte count for the packet, to transfer this information to the forwarding process along with a pointer to the location of the data packet in packet ram. Additionally, the input port number is sent to the forwarding process (from the DMA). The forwarding process then proceeds.

The common bus 11 also indicates which port is transferring the data into the packet ram 12; this information is used by the lookup circuitry 14 so that it may associate the DA-SA data with a certain inbound port (step 24). The lookup circuitry 14 is where the connection database table is maintained. This table is what is established by the SFPS connection setup application. It indicates for a particular DA-SA pair on which port(s) the data shall be sent outbound. The table also provides a field which identifies the allowable in-port for this DA-SA connection. The lookup circuitry will match the actual inbound port with the allowable in-port to ensure that the data has entered this switch from a pre-authorized location (step 24).

The lookup process passes an information structure to the forwarding logic, which the forwarding logic acts on. The information structure, known as the "results" word, contains the following:

1) In_port—the allowable in_port, used by the lookup process.
2) Out_port/Index—this will be a single port number, or an index into a ram which contains a port_mask to be used when the packet is intended to be delivered out more than one port. This ram is located within the forwarding logic.
3) The actual in_port—to be used for statistics collection, since the lookup process has performed the in_port match against the allowable in_port field.
4) In_port violation—a single bit indicating that the in_port check passed/failed; this is used by the forwarding logic.
5) Unknown connection—a bit indicating that the connection entry was not found in the connection database. This packet will be delivered to the host for directory assistance.

The forwarding logic acts on this data to produce a "outmask." This is a mask that is as wide as the number of ports in the system. This mask, for each bit set, indicates the desire to forward this data packet out the specified ports.

The forwarding logic 14 waits on two pieces of information to complete its task, which is to write the outmask to the transmit queue logic 15. One piece of information is the results word for a given port (from the lookup logic—step 24); the second is a data structure that is written by the DMA control logic 16 (a pointer to where data resides in packet RAM—step 22).

The forwarding process upon receiving this structure from the DMA checks with the lookup process for the completion of the table search and result word formation for that port. If lookup search and frame reception are both complete, the forwarding process 14 then translates the out_port information into a mask which it writes to the transmit queues 15.

There exists at least one transmit queue per port (see $Q_1, \ldots, Q_n$ in transit queue 15 of FIG. 2). Each queue is connected to a network interface block $NIB_1, \ldots, NIB_n$, respectively. If an entry exists on a queue, the port that the queue is associated with is signaled so that the port may request that information. A queue entry is merely a pointer to a data packet which resides in packet ram. This pointer is what the forwarding process writes onto the queue in what is called a forwarding operation. The port then signals to the MPA 13 that it wishes to perform an outbound data transfer. Once granted, the DMA controller 16 will source the appropriate data from the packet ram 12 onto the packet bus 11 (step 27). There is a link 17 between the DMA control process and the queue process. When transmitting, the DMA reads the pointer entry off the appropriate queue based on the port number that is requesting the transmit operation. All along, the DMA process has been maintaining in its internal memory the length of each packet in the packet ram. When the pointer is read from the queue and the transmit operation begins, the DMA process decrements a working count value which is first loaded with the full packet length. As transmission proceeds and this counter reaches zero, the DMA process signals "end of frame" (EOF) and the port stops requesting data transfers (unless there is another entry on its transmit queues).

Figure 4:
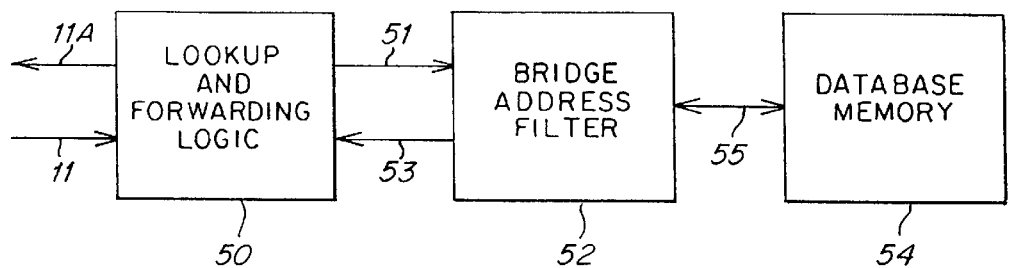
FIG. 4 is a schematic block diagram of the lookup and forwarding circuitry and memory access circuitry according to the invention.

Reference is now made to FIG. 4, which figure illustrates a more detailed embodiment of the lookup and forwarding logic and connection database 14 illustrated in FIG. 2. The circuit includes two ASICS (Application Specific Integrated Circuits) and a database memory. A bridge address filter (BAF) 52 connects to a database memory 54 and handles the data searches. Database memory 54 contains the connection database that includes the connection tables. Database memory 54 may be a random access memory, a static memory, or any other appropriate memory technology.

The lookup forwarding logic 50 monitors packets arriving on packet databus 11, extracts the relevant data from them, formats the data, and presents this data on line 51 to bridge address filter 52. The bridge address filter 52 in turn checks the data against the entries currently contained in the connection database. If there is no match, bridge address filter 52 transmits a signal over line 53 to the lookup forwarding logic 50 to inform it that no match was found. On the other hand, if there is a match, the bridge address filter 52 presents the lookup and forwarding logic with the lookup result word on line 53 and this word is used to buy lookup and forwarding logic 50 to provide a forwarding decision on line 11A as described above.

As part of the lookup process, the bridge address filter will also supply to the lookup forwarding logic a unique node identification number for the given source address or destination address. The node identification number is an arbitrary 14 bit number corresponding to the 48 bit MAC layer address.

One skilled in the art will appreciate that, in a straightforward implementation, every source address/destination address and destination address/source address combination will require an entry in the connection table.

In accordance with the invention, however, only a single entry in the connection table is required and no determination needs to be made as to which node is the source of a packet and which node is the destination of a packet. Instead, in the present invention, a data structure and method of analyzing the data contained in the data structure are used in which knowledge of the node identification number and the magnitude of the node identification number of the sending node and the magnitude of the node identification number of the receiving node are used. In particular, the data in the data structure is organized so that the various input ports and output ports are located in a predetermined location in the data structure. As will be explained below, knowledge of the node identification number and the predetermined locations of various data in the data structure allows the system to rapidly provide the output port identification for a given packet. Additionally, since only a single entry in the connection table is required for each combination of nodes on the network, the amount of memory required is reduced by 50%. Alternatively, if the same size memory as conventionally required is provided, then the connection table can hold twice as many entries.

Figure 5:
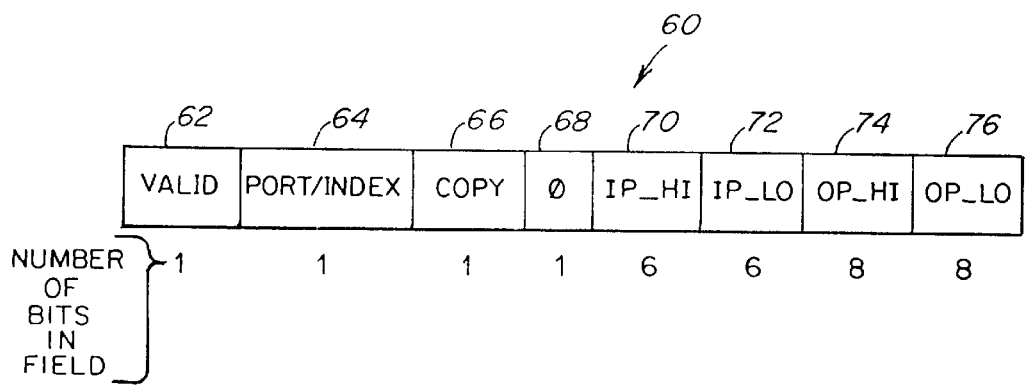
FIG. 5 is a data structure stored in the memory of FIG. 4 that is used when the SA and DA are taken as a pair.

Reference is now made to FIG. 5, which figure illustrates a data structure and the data contained therein in accordance with the invention.

When the fast packet switch through the lookup and forwarding logic 50 queries database 54 as to whether the given node pair is listed in the connection database, the bridge address filter provides data structure 60 and the data contained therein on line 53 to the lookup forwarding logic 50. Data structure 60 contains the following fields:

Field 62 is a 1 bit validity check. If the value of this bit is 1, the MAC address was not found and none of the other fields having meaning. If the value of this bit is 0, the address was found and the fields are valid.

Field 64 is a 1 bit port/index region. If this bit is 1, the outbound port (S) field contains a single port number where the frame should be sent. If this bit is 0, the outbound port (S) field contains an index into a table inside the lookup forwarding ASIC. The values programmed into the table represent the ports where the frame should go. Region 64 is used for multi-destination frames.

Field 66 is a 1 bit copy region. If this bit is 0, the frame should be copied to a specially programmed copy port as well as its normal destination.

Field 70 contains the identification of the input port to check against if the higher (magnitude) node identification in the particular node pair was the sender.

Field 72 contains the identity of the input port to check against if the lower (magnitude) node identification number in the node pair was the sending node.

Field 74 contains the identification of the output port to be used if the node identification number of the sending node in the given node pair has the higher (magnitude) node identification number.

Field 76 is an 8 bit region containing the identification of the output port to be used if the node identification number of the sending node in the given node pair has the lower (magnitude) node identification number This data structure containing the described data is always provided by bridge address filter 52 to lookup forwarding logic 50 for the node pair that is being checked. It does not matter which node was the sending node or which node was the receiving node; the same data is provided organized the same way in the data structure.

The lookup and forwarding logic then interprets the data in data structure 60 based upon which node actually was the sending address and which node actually was the destination address. Lookup and forwarding logic 50 determines where the packet should go by examining the magnitudes of the node identification numbers of the node involved. If the node that has the higher node identification number is the sender of the packet, the outbound port information for the connection is found in field 74. If the node that has the lesser node identification is the sender of the packet, the outbound port information for the connection is found in field 76 of data structure 60. Similarly, if the node that has the greater node identification number is the sending node, the allowable input port for the packet is found in field 70. Similarly, if the node that has the lesser node identification number is the sending node, the allowable input port is found in field 72. By assigning node identification numbers and interpreting the connection entry in this manner only one connection entry is needed for every pair of communicating nodes instead of for every combination of sending and receiving nodes.

By finding the appropriate connection entry, and examining the magnitude of the node identification numbers involved, lookup and forwarding logic and connection database 14 can determine the outbound destination port (s) and the allowable input port for the packet. If the packet did in fact come in the allowed port, it is sent to the destination port (s) specified in the connection entry. If it came from any other port, it is flagged as a security violation, and sent to, for example, a programmable violation port (s).

3. SFPS Functions

The "secure" feature of the SFPS means that no traffic is allowed through the switch until "programmed" by the SCS (switch agent). All end-to-end system connections passing through the switch must be validated, i.e., by way of access list, virtual LAN, policy, etc. The switches register with the SCS before becoming operational. The switches "discover" and report end systems on each port of the switch to the SCS. This allows the SCS to learn the SFPS topology without the SFPS switches having to run a distributed topology exchange protocol.

The "fast" feature of the SFPS may be accomplished on hard cards, wherein packet switching is done completely in hardware ASICS. The network interface block (NIB) handles the media interface. All NIBs translate data into a common internal frame format, i.e., the canonical format. The lookup engine extracts the key fields from the frame (i.e., MAC source and destination addresses) as the first burst of data is transferred from the NIB to packet ram. The extracted data is then "looked up" in the connection table. The lookup engine provides the search function as well as dynamic learning and aging of table entries. The search result is a code either programmed by the host CPU or learned by hardware that indicates where the frame should be forwarded based on the key fields. When the result operation is complete, the results are delivered to the forwarding engine.

Alternatively, the "fast" feature can be provided by soft cards, wherein packet switching logic is minimized. There are no hierarchical lookups or header decoding beyond the MAC address header. There is no variable length packet headers or addresses. There is no protocol type processing.

The "packet" feature of SFPS means that the switch supports existing LAN packet formats, e.g., Ethernet, Token Ring and FDDI. No segmentation or reassembly of packets is required.

The "switching" feature in SFPS means that the switch treats data flows as connections. The source port, source MAC and destination MAC become a unique tuplet which serves as a connection identifier. The switch always forwards (switches) the packet out the correct output port; there is no flooding out all ports. The switch uses an arbiter to share switch bandwidth and ports. When the network management service provides for distributed management of all modules in the networking chassis, it is possible to guarantee performance to designated users and provide varying levels of quality of service.

4. The SFPS Host Agent

Figure 6A:
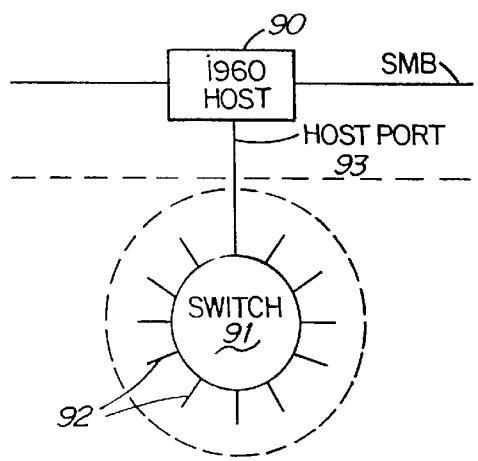
FIG. 6A is a schematic illustration of an SFPS switch.
Figure 6B:
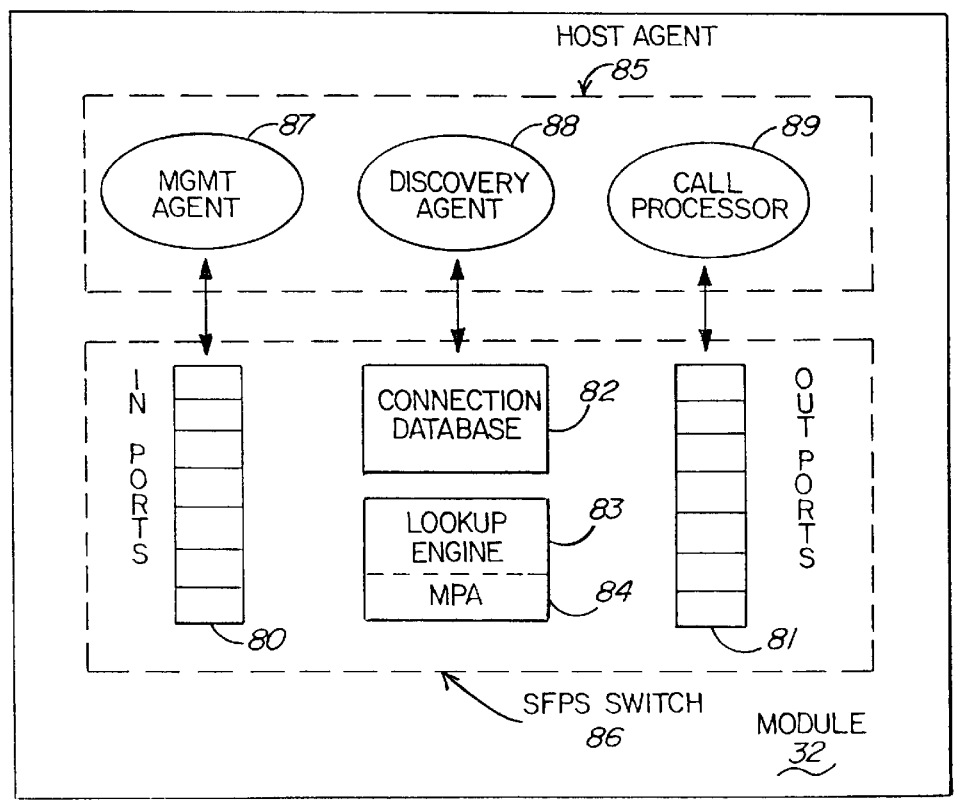
FIG. 6B is a logical view of an SFPS switch.
Figures 1, 6C:
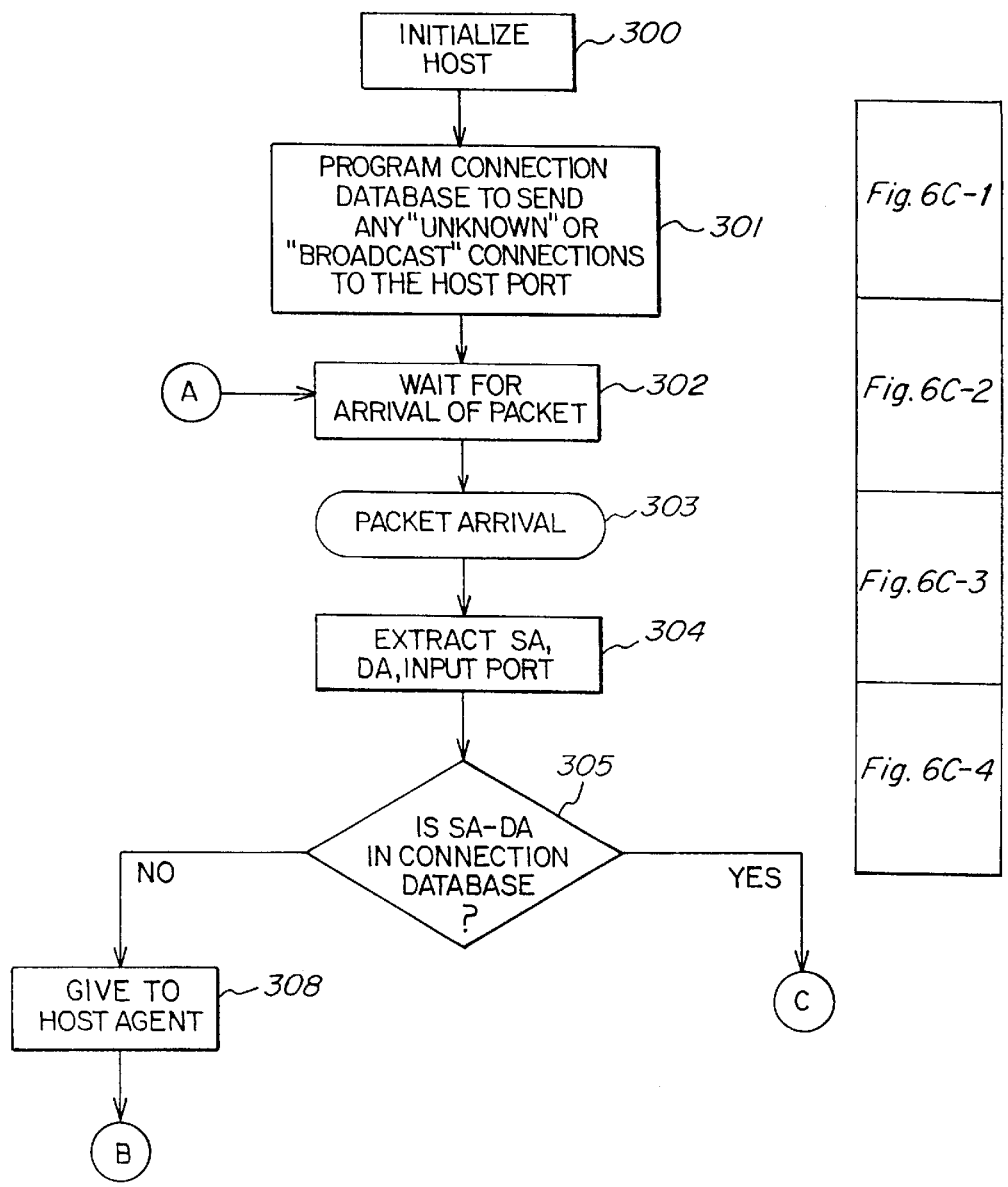
Figures 2, 6C:
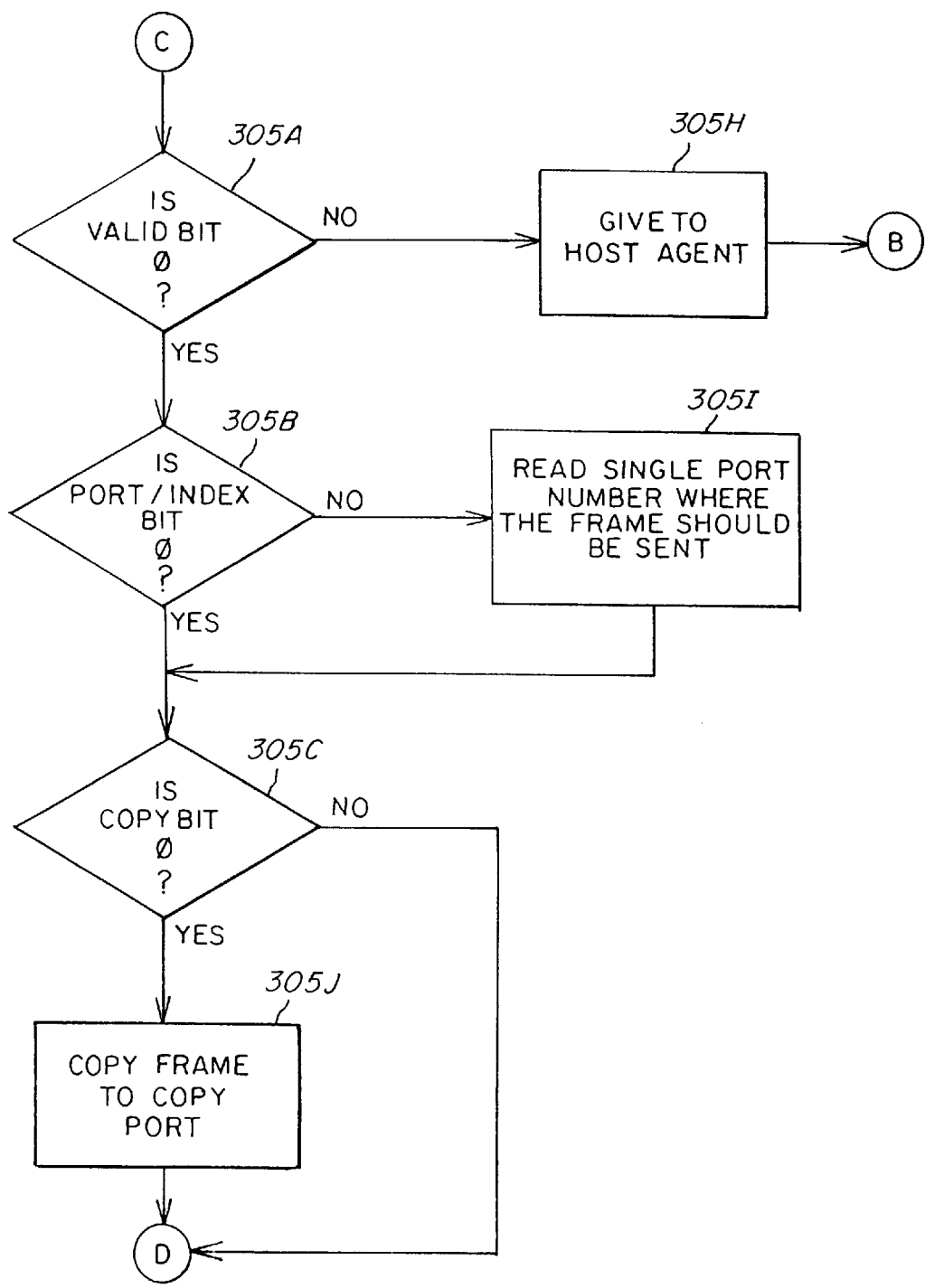
Figures 3, 6C:
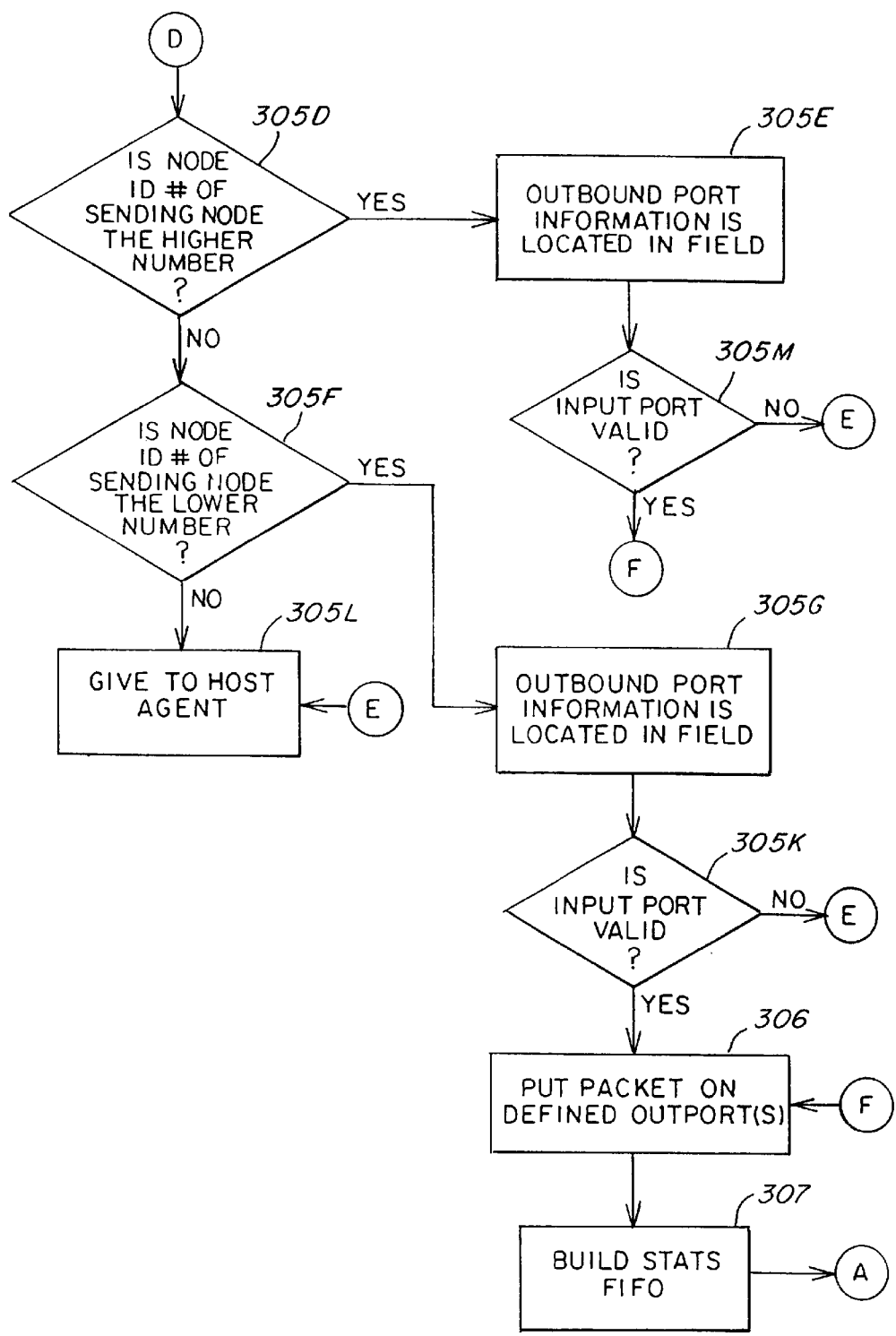
Figures 4, 6C:
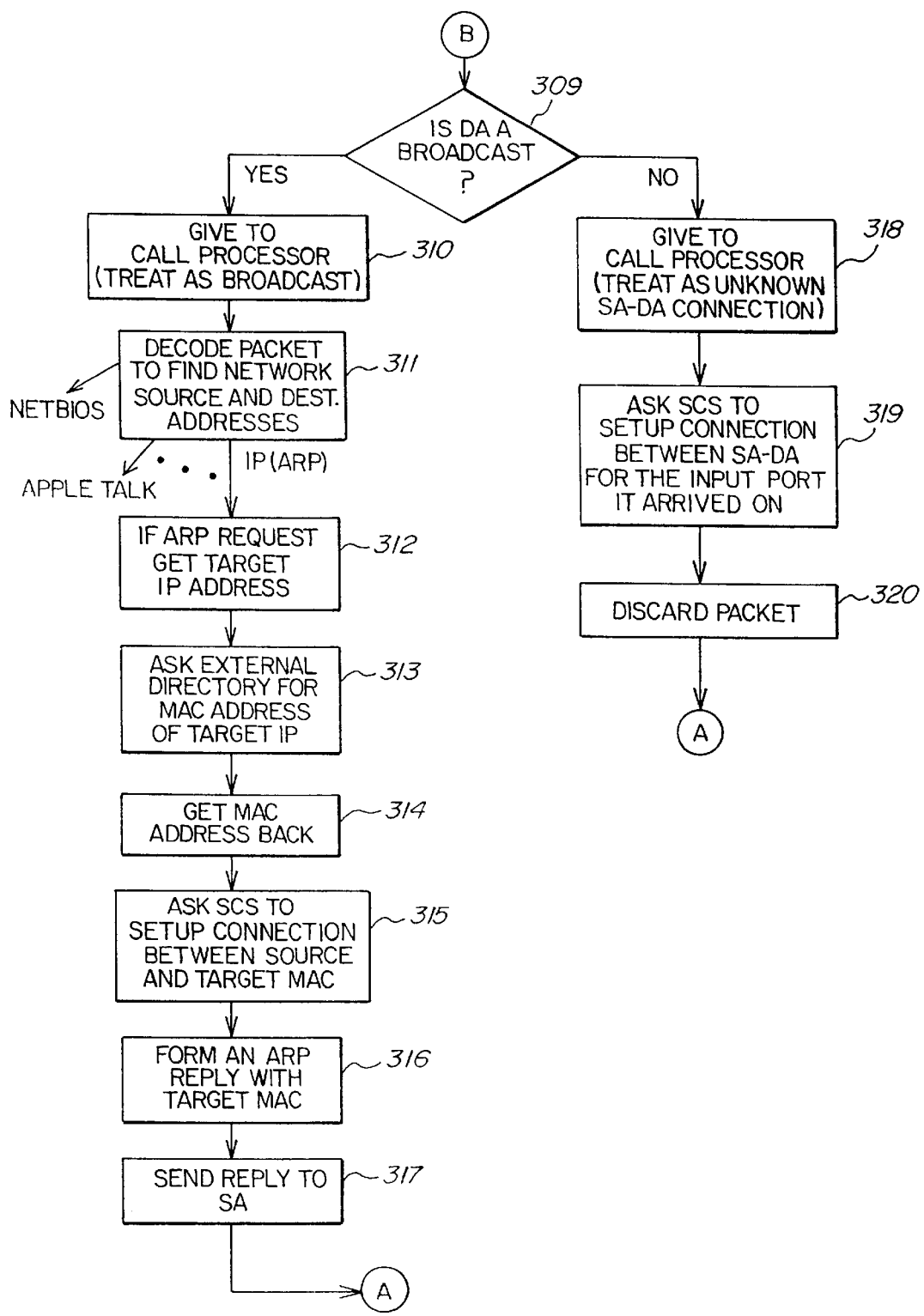

The operation of the SFPS host agent is best illustrated in FIGS. 6A–6C.

FIG. 6A is a schematic illustration of a SFPS switch 91 having a plurality of ports 92. A host port 93 connects the switch to its host CPU 90, which may be an i960 microprocessor sold by Intel Corporation. The host CPU is connected to the system management bus (SMB) for receipt and transmission of discovery and other control messages between modules in the networking chassis.

FIGS. 6B–6C illustrate the internal operation of the switch. The SFPS switch 86 includes in ports 80, out ports 81, connection database 82, look-up engine 83, and a multilevel programmable arbiter MPA 84. All of these components have been previously discussed with regard to the switch shown in FIG. 2. The switch 86 sends and receives messages from the host agent 85, which includes a management agent 87, a discovery agent 88, and a call processing agent 89. The interaction of the host agent, switch, SCS and end system will be described in the following paragraphs, and is illustrated in the flow chart of FIG. 6C.

The management agent 87 provides external control of the configuration and operation of the SFPS switch, through the network management system.

The discovery agent 88 provides a mapping of end systems to switching ports through a passive listening (snooping) capability and a registering of end system addresses and port locations of the host switch with an external directory located in the SCS. Adjacent switches are also discovered and mapped, but this may be done with an explicit switch-to-switch protocol (nonpassive).

The call processor 89 provides a means for requesting connections to be established between two end systems. In the case where the source-destination MAC addresses are not in the packet frame, i.e., usually in a frame that has a broadcast—all hosts—MAC address, the call processor will decode the packet to find source or destination network addresses and will use these to map back into the mapped addresses from the external directory located in the SCS. Once the end system MACs addresses are known, the call processor will then request the connection between the end systems. If the broadcast frame was a probe or address resolution packet (i.e., an implied connect request), the call processor will return a probe reply as a "proxy" which gives the destination end system MAC addresses. Subsequently, the source end system can then send packets directly to the destination based on its MAC address.

FIGS. 6C-1 through 6C-4 is a flow chart illustrating what happens from the time a data packet is received on an input port of the switch, until it is sent on the correct output port.

Referring to FIG. 6C-1, in step 300 the host is initialized. In step 301, the host programs the connection database to send any "unknown" or "broadcast" connections to the host port. In the next step 302, the switch waits for a packet to arrive. In the next step 303, a packet has arrived. In step 304, the switch extracts the source MAC address, destination MAC address, and identifies the inbound port on which the packet was received. In step 305, the look-up engine checks to see whether this source-destination pair is already located in the connection database. If it is not found in step 308, the packet is given to the host agent. The call processor and the host agent determine whether it is a broadcast destination (step 309). If the answer is yes, the call processor decodes the packet to find the network protocol source and destination addresses (steps 310–311). A different protocol decode logic would be provided for each network protocol. For example, in the IP protocol, if an ARP request is received, the call processor would get the target IP address (step 312). It would then ask the external directory (SCS) for the MAC address of the target IP (step 313). In the next step 314, the SCS sends the MAC destination address back to the call processor. In step 315, the call processor asks the SCS to set up a connection between the source MAC and destination MAC. In step 316, the call processor forms an ARP reply packet by putting the destination MAC address inside the packet. In step 317, the call processor sends a reply to the source address. It should be noted that this reply allows the source end system to update its private mapping of the destination IP address to a nonbroadcast MAC address. All subsequent packets to this destination IP address will be properly framed with the source and destination MAC address for which connections will now exist.

Returning to step 305, if the source and destination MAC (i.e. physical layer addresses) pair are found in the connection table, the data structure and data illustrated in FIG. 5 are provided by bridge address filter 52 to lookup and forwarding logic 50. In step 305A, lookup forwarding logic 50 checks to see if the valid bit in field 62 is equal to 0. If the answer is yes, the lookup and forwarding logic proceeds to step 305B. If the answer is no and the valid bit is 1, the MAC address was not found and the lookup forwarding logic proceeds to step 305H in which the packet is provided to the host agent for further processing.

Returning to step 305B the lookup and forwarding logic checks if the port/index bit in field 64 is 0. If the answer is yes, the lookup and forwarding logic checks its internal table to determine the ports where the frame should go. If the answer is no in step 305B, the lookup and forwarding logic proceeds to step 305I in which identifies the single port number where the frame should be sent. From step 305I the lookup and forwarding logic proceeds to step 305C. In step 305C, the lookup and forwarding logic checks if the copy bit in field 66 is equal to 0. If the answer is yes in step 305C, the lookup and forwarding logic proceeds to step 305J in which the frame is copied to a specially programmed copy port as well as its normal destination. From step 305J, the lookup and forwarding logic proceeds to step 305D. Returning to step 305C, if the answer is no, the lookup and forwarding logic proceeds to step 305D. In step 305D, the lookup and forwarding logic checks to determine if the node identification number of the sending node is the higher (magnitude) number. If the answer is yes, the lookup and forwarding logic proceeds to step 305E in which the output port identification information is read from field 74. From step 305E, the lookup and forwarding logic proceeds to step 305M. In step 305M, the lookup and forwarding logic checks if the input port that the packet arrived on is a valid input port. If the answer is yes, the lookup and forwarding logic proceeds to step 306 in which the data packet is sent to the switch output port (s) defined in the database. On the other hand, if the answer in step 305M is no, the lookup and forwarding logic proceeds to step 305L in which the packet is given to the host agent because a possible security violation may have occurred.

On the other hand, if the answer in step 305D is no, the lookup and forwarding logic proceeds to step 305F. In step 305F, the lookup and forwarding logic determines if the node identification number of the sending node is the lower (magnitude) identification number. If the answer in step 305F is yes, the lookup and forwarding logic proceeds to step 305G in which the output port information is read from field 76. From step 305G, the lookup and forwarding logic proceeds to step 305K. Returning to step 305F, if the answer is no, the lookup and forwarding logic proceeds to step 305L in which the packet is provided to the host agent because no match has been found and a possible security violation may have occurred.

In step 305K, the lookup and forwarding logic checks if the input port that the packet arrived on is a valid input port. If the answer is yes, the lookup and forwarding logic proceeds to step 306 in which the data packet is sent to the switch output port (s) defined in the database. On the other hand, if the answer in step 305K is no, the lookup and forwarding logic proceeds to step 305L in which the packet is given to the host agent because a possible security violation may have occurred. From step 306, the system proceeds to step 307 in which the management agent collects statistics regarding transmissions through the switch and sends them to the SCS.

In the course of carrying out steps 305–305M, two additional lookups in database memory 54 are also performed. The system in fact performs a total of three lookups. The first lookup is to determine if the source address of the node is found in the database memory. The second lookup is to determine if the destination address of the node is found in the database memory. The third lookup, which has been described in steps 305A–305M is to determine if the combination of source address and destination address is found in database memory 54.

In the first two lookups, the source address and destination address are looked up individually to obtain the node identification numbers of the source address node and the destination address node. As described previously, these node identification numbers are there after used to determine the routing of the packet. A data structure may be provided that in addition to containing the node identification numbers, also contains additional information that can be used to enhance the performance of the secure fast packet switch.

Figure 7:
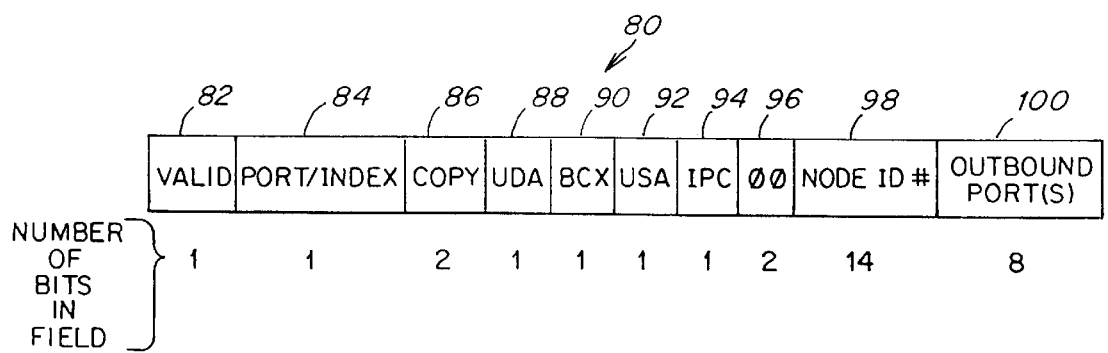
FIG. 7 illustrates a data structure stored in the memory illustrated in FIG. 4 that is used when individually obtaining the node entries of the SA and DA for a particular connection.

Reference is now made to FIG. 7, which figure illustrates an exemplary data structure containing information stored in database memory 54 that is provided by the bridge address filter to lookup forwarding logic 50 in response to a lookup for an individual source address or destination address. In particular, data structure 80 contains a number of fields as follows:

Fields 82, 84, and 86 are analogous to fields 62, 64, and 66 of data structure 60 in FIG. 5. With respect to field 86, in data structure 80, this is a 2 bit region. If the bits are 0 0, all frames involving this match should be copied. If the bits are 0 1, some frames involving this MAC should be copied. In this case, data structure 60 is used to make the decision to copy or not. If the bits are 1 0, no frames involving this MAC should be copied. If this node is either sending or receiving a frame, the frame itself should be sent to the port (s) indicated in the programmable copy register of the lookup and forwarding logic in addition to its normal destination. Also, a connection entry field can tag a given connection as being targeted for copying. If a frame is passing between the two nodes described by the connection entry, the frame should be sent to the output port (s) indicated in the programmable copy register of the lookup and forwarding logic in addition to its normal destination. These features allow high speed monitoring of frames on a network that have a certain DA and/or SA.

Field 88 is a 1 bit region that, if set to 0, indicates this is an unrestricted destination address and the third lookup is not required. This means that the MAC address is allowed to be freely accessed by any other node in the database. If the DA is marked DA unrestricted, then the outbound port for the packet is contained in the DA node entry and a connection entry for this pair is not needed or for any other pair that uses this node as a DA. This can greatly reduce the number of connection entries needed in the system if there are several nodes that do not need to restrict access.

Field 90 is a 1 bit broadcast exception region that, if set to 0, indicates that this MAC needs to override the default broadcast register for its broadcast frames. The third lookup to obtain the data contained in data structure 60 is necessary to obtain the override information. This means that if the node in question is sending a broadcast frame, the outbound destination ports are located in a programmable broadcast register in the lookup forwarding logic and a connection entry is not needed. This means that there does not need to be a connection entry programmed for every node on the network sending to the broadcast address; the broadcast register can be programmed with a default value for broadcast frames to be sent, and only those nodes with a need for an exceptional route for their broadcast frames require a connection entry. This can reduce the number of connection entries needed since virtually all nodes will send broadcast frames at one time or another, and many of them will not need exceptional routing; broadcast frames are typically sent out all ports on the switch.

Field 92 is a 1 bit region that, if equal to 0, indicates that this is an unrestricted source address and the third lookup is not required. This allows "super user" functionality where a node is allowed to send packets to any other node in the database. If the SA is marked SA unrestricted, then the outbound port for the packet is contained in the DA node entry and no connection entry is required for this pair, or for any other pair that uses this node as an SA. This can reduce the number of connection entries needed in the system if there are several nodes that are permitted to send to any one.

As will be evident to one of ordinary skill in the art, providing data structure 80 with the indicated regions allows the system to once again reduce the number of entries in the connection table and to eliminate node pair entries where they are not required. In addition, providing the extra information in the data structure allows the system to operate faster, because a number of these situations, the third lookup is not required, as the information needed to route the packet is contained with data structure 80 itself.

Field 94 is a 1 bit input port check region that, if set to 0, instructs the system to check that the frame came in the correct input port. The third lookup to obtain the data contained in data structure 60 will indicate the correct input port.

Field 96 is unused.

Field 98 contains the 14 bit node identification number for this MAC.

Field 100 is an 8 bit wide outbound port identification region that indicates where to send the frames destined for this MAC. This information is used only if there is no third lookup. Typically, there will be a third lookup and the outbound port (s) will be found in data structure 60.

In addition, lookup forwarding logic 50 can monitor certain bits of the incoming packet and thereby automatically reroute packets in particular cases without requiring any database lookups. In this manner, a significant amount of processing time can be saved. The following four items, for example, can be examined by lookup and forwarding logic 50 without the need for a database lookup:

1. Errored frame—the packet error bit for the frame may also be examined. If this bit indicates an error, the frame may be automatically rerouted to a programmable error port so that network trouble shooters can examine the problem.
2. FDDI SMT frames—if the frame is an FDDI SMT multicast frame, it may be automatically sent to a programmable SMT board so that the microprocessor handling SMT can receive the frame faster.

3. Frames needing host intervention—if the frame is marked as Two-Host frame (one requiring any special attention before the frame is sent out of the switch), the frame may be automatically rerouted to the programmable host processor port so that it can be examined by software. This facilitates some Token Ring 802.5 functions as well as any other cases that region host intervention.

4. Lookup By-pass frames—if the frame is marked as lookup by-pass, this means that the destination port of the frame is located within the frame itself. The lookup and forward logic ASIC interprets this information and automatically passes the frame out the port (S) specified within the frame.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A switch, comprising:

a memory for storing data;

a single entry stored in the memory for each pair of nodes between which a communication is permitted, each pair of nodes including a first node and a second node each having a physical layer address, the entry being accessible based upon the physical layer addresses of the first and second nodes, the entry comprising:

a first field in a first predetermined location in the entry, the first field identifying a first input port in the switch when the first node is a source of the communication;

a second field in a second predetermined location in the entry, the second field identifying a second input port in the switch when the first node is a destination of the communication;

a third field in a third predetermined location in the entry, the third field identifying a first output port in the switch when the first node is the source of the communication; and a fourth field in a fourth predetermined location in the entry, the fourth field identifying a second output port in the switch when the first node is the destination of the communication.

2. A switch, comprising:

a memory for storing data; and a single entry stored in the memory for each pair of nodes between which a communication is permitted, each pair of nodes including a first node and a second node each having a physical layer address, the entry being accessible based upon the physical layer addresses of the first and second nodes, the entry including first and second fields stored in corresponding first and second predetermined locations in the entry;

wherein the first predetermined location at which the first field is stored identifies a first output port of the switch to which the communication is sent when the first node is the source of the communication and wherein the second predetermined location at which the second field is stored identifies a second output port of the switch to which the communication is sent when the first node is a destination of the communication.

3. The switch of claim 2, wherein the entry further includes:

third and fourth fields stored in corresponding third and fourth predetermined locations in the entry;

wherein the third predetermined location at which the third field is stored identifies a first input port of the switch on which the communication is received when the first node is the source of the communication and wherein the fourth predetermined location at which the fourth field is stored identifies a second input port of the switch on which the communication is received when the first node is the destination of the communication.

* * * * *